(12) United States Patent
Megiddo et al.

(10) Patent No.: US 7,167,953 B2
(45) Date of Patent: Jan. 23, 2007

(54) SYSTEM AND METHOD FOR ADAPTIVELY MANAGING PAGES IN A MEMORY

(75) Inventors: Nimrod Megiddo, Palo Alto, CA (US); Dharmendra Shantilal Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 11/151,363

(22) Filed: Jun. 13, 2005

(65) Prior Publication Data
US 2005/0235114 A1    Oct. 20, 2005

Related U.S. Application Data

(63) Continuation of application No. 10/295,507, filed on Nov. 14, 2002, now Pat. No. 6,996,676.

(51) Int. Cl.
*G06F 12/00* (2006.01)

(52) U.S. Cl. .................. 711/129; 711/133; 711/170
(58) Field of Classification Search ................ 711/129, 711/133, 170
See application file for complete search history.

(56) References Cited

U.S. PATENT DOCUMENTS

| | | | | |
|---|---|---|---|---|
| 4,463,424 A | * | 7/1984 | Mattson et al. | 711/136 |
| 4,503,501 A | * | 3/1985 | Coulson et al. | 711/129 |
| 4,780,815 A | * | 10/1988 | Shiota | 711/171 |
| 5,752,255 A | * | 5/1998 | Jarvis | 711/3 |

* cited by examiner

*Primary Examiner*—Jack A. Lane
(74) *Attorney, Agent, or Firm*—Samuel A. Kassatly

(57) ABSTRACT

An adaptive replacement cache policy dynamically maintains two lists of pages, a recency list and a frequency list, in addition to a cache directory. The policy keeps these two lists to roughly the same size, the cache size c. Together, the two lists remember twice the number of pages that would fit in the cache. At any time, the policy selects a variable number of the most recent pages to exclude from the two lists. The policy adaptively decides in response to an evolving workload how many top pages from each list to maintain in the cache at any given time. It achieves such online, on-the-fly adaptation by using a learning rule that allows the policy to track a workload quickly and effectively.

20 Claims, 11 Drawing Sheets

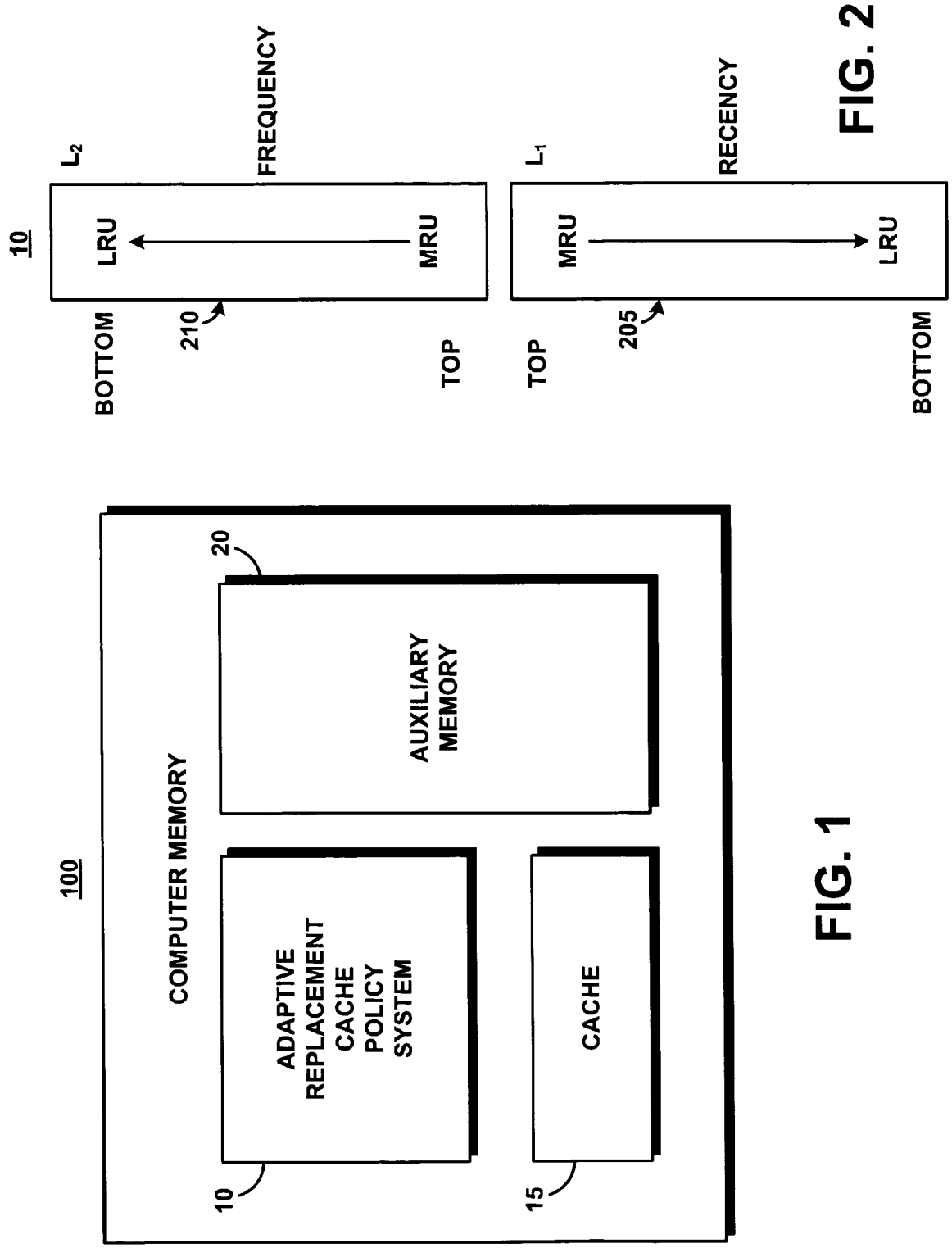

SYSTEM AND METHOD FOR ADAPTIVELY MANAGING PAGES IN A MEMORY

PRIORITY CLAIM

The present invention application is a continuation of, and claims the priority of, U.S. patent application, Ser. No. 10/295,507, filed on Nov. 14, 2002, now U.S. Pat. No. 6,996,676 titled "System and Method for Implementing an Adaptive Replacement Cache Policy," which is incorporated herein by reference.

FIELD OF THE INVENTION

The present invention generally relates to data processing systems, and in particular to an adaptive replacement cache policy that minimizes cache misses. More specifically, this invention presents a cache replacement policy system and method that achieve improved cache performance by managing the cache with a directory and further by using a self-tuning (or self-adjusting) parameter that adapts to changes in the cache workload.

BACKGROUND OF THE INVENTION

Computer memory systems generally comprise two memory levels: main (or cache) and auxiliary. Cache memory is faster than auxiliary memory, but is also significantly more expensive. Consequently, the size of the cache memory is usually only a fraction of the size of the auxiliary memory.

Caching is one of the most fundamental metaphors in modern computing. It is widely used in storage systems, databases, web servers, middleware, processors, file systems, disk drives, and operating systems. Memory caching is also used in varied and numerous other applications such as data compression and list updating. As a result a substantial progress in caching algorithms could affect a significant portion of the modern computation stack.

Both cache and auxiliary memories are managed in units of uniformly sized items known as pages. Requests for pages are first directed to the cache. A request for a page is directed to the auxiliary memory only if the page is not found in the cache. In this case, a copy is "paged in" to the cache from the auxiliary memory. This is called "demand paging" and it precludes "pre-fetching" pages from the auxiliary memory to the cache. If the cache is full, one of the existing pages must be paged out before a new page can be brought in.

A replacement policy determines which page is "paged out." A commonly used criterion for evaluating a replacement policy is its hit ratio, the frequency at which a page is found in the cache as opposed to finding the page in the auxiliary memory. The miss rate is the fraction of pages paged into the cache from the auxiliary memory. The replacement policy goal is to maximize the hit ratio measured over a very long trace while minimizing the memory overhead involved in implementing the policy.

Most current replacement policies remove pages from the cache based on "recency" that is removing pages that have least recently been requested, "frequency" that is removing pages that are not often requested, or a combination of recency and frequency. Certain replacement policies also have parameters that must be carefully chosen or "tuned" to achieve optimum performance.

The replacement policy that provides an upper bound on the achievable hit ratio by any online policy is Belady's MIN or OPT (MIN). However, this approach uses a prior knowledge of the entire page reference stream and is not realizable in practice when the page reference stream is not known ahead of time. MIN replaces the page that has the greatest forward distance. Given MIN as a reference, a replacement policy that automatically adjusts to an observed workload is much preferable.

The most commonly used replacement policy is based on the concept of replace the least recently used (LRU) page. The LRU policy focuses solely on recency, always replacing the least recently used page. As one of the original replacement policies, approximations and improvements to LRU abound. If the workload or the request stream is drawn from a LRU Stack Depth Distribution (SDD), then LRU is the optimal policy.

LRU has several advantages: it is relatively simple to implement and responds well to changes in the underlying Stack Depth Distribution (SDD) model. However, while the SDD model captures recency, it does not capture frequency. Each page is equally likely to be referenced and stored in cache. Consequently, the LRU model is useful for treating the clustering effect of locality but not for treating non-uniform page referencing. In addition, the LRU model is vulnerable to one-time-only sequential read requests, or scans, that replace higher-frequency pages with pages that would not be requested again, reducing the hit ratio. In other terms, the LRU model is not "scan resistant."

The Independent Reference Model (IRM) provides a workload characterization that captures the notion of frequency. Specifically, IRM assumes that each page reference is drawn in an independent fashion from a fixed distribution over the set of all pages in the auxiliary memory. Under the IRM model, the least frequently used (LFU) policy that replaces the least frequently used page is optimal.

While the LFU policy is scan-resistant, it presents several drawbacks. The LFU policy requires logarithmic implementation complexity in cache size and pays almost no attention to recent history. In addition, the LFU policy does not adapt well to changing access patterns since it accumulates state pages with high frequency counts that may no longer be useful.

A relatively recent algorithm, LRU-2, approximates the LFU policy while eliminating its lack of adaptivity to the evolving distribution of page reference frequencies. The LRU-2 algorithm remembers, for each page, the last two times that page was requested and discards the page with the least recent penultimate reference. Under the Independent Reference Model (IRM) assumption, the LRU-2 algorithm has the largest expected hit ratio of any online algorithm that knows the two most recent references to each page.

The LRU-2 algorithm works well on several traces. Nonetheless, LRU-2 still has two practical limitations:
1. The LRU-2 algorithm maintains a priority queue, requiring logarithmic implementation complexity.
2. The LRU-2 algorithm contains one crucial tunable parameter, namely, Correlated Information Period (CIP). CIP roughly captures the amount of time a page seen only once recently should be kept in the cache.

In practice, logarithmic implementation complexity engenders a severe memory overhead. Another algorithm, 2Q, reduces the implementation complexity to constant per request rather than logarithmic by using a simple LRU list instead of the priority queue used in LRU-2 algorithm. Otherwise, the 2Q algorithm is similar to the LRU-2 algorithm.

The choice of the parameter Correlated Information Period (CIP) crucially affects performance of the LRU-2 algorithm. No single fixed a priori choice works uniformly well across various cache sizes. Consequently, a judicious selection of this parameter is crucial to achieving good performance.

Furthermore, no single a priori choice works uniformly well across various workloads and cache sizes. For example, a very small value for the CIP parameter works well for stable workloads drawn according to the Independent Reference Model (IRM), while a larger value works well for workloads drawn according to the Stack Depth Distribution (SDD), but no value works well for both. This underscores the need for online, on-the-fly adaptation.

However, the second limitation of the LRU-2 algorithm persists even in the 2Q algorithm. The algorithm 2Q introduces two parameters, $K_{in}$ and $K_{out}$. The parameter $K_{in}$ is essentially the same as the parameter CIP in the LRU-2 algorithm. Both $K_{in}$ and $K_{out}$ are parameters that need to be carefully tuned and both are sensitive to workload conditions and types.

Another recent algorithm similar to the 2Q algorithm is Low Inter-reference Recency Set (LIRS). The LIRS algorithm maintains a variable size LRU stack whose LRU page is the $L_{lirs}$-th page seen at least twice recently, where $L_{lirs}$ is a parameter. From all the pages in the stack, the LIRS algorithm keeps in the cache all the $L_{lirs}$ pages seen at least twice recently as well as the $L_{lirs}$ pages seen only once recently.

The parameter $L_{lirs}$ is similar to the CIP of the LRU-2 algorithm or $K_{in}$ of 2Q. Just as the CIP affects the LRU-2 algorithm and $K_{in}$ affects the 2Q algorithm, the parameter $L_{lirs}$ crucially affects the LIRS algorithm. A further limitation of LIRS is that it requires a certain "stack pruning" operation that, in the worst case, may have to touch a very large number of pages in the cache. In addition, the LIRS algorithm stack may grow arbitrarily large, requiring a priori limitation. However, with a stack size of twice the cache size, LIRS becomes virtually identical to 2Q with $K_{in}=1\%$ and $K_{out}=99\%$.

Over the past few years, interest has focused on combining recency and frequency in various ways, attempting to bridge the gap between LRU and LFU. Two replacement policy algorithms exemplary of this approach are frequency-based replacement, FBR, and least recently/frequently used, LRFU.

The frequency-based replacement algorithm, FBR, maintains a least recently used (LRU) list, but divides it into three sections: new, middle, and old. For every page in cache, the FBR algorithm also maintains a counter. On a cache hit, the FBR algorithm moves the hit page to the most recently used (MRU) position in the new section. If the hit page was in the middle or the old section, then its reference count is incremented. If the hit page was in the new section then the reference count is not incremented; this key concept is "factoring out locality". On a cache miss, the FBR algorithm replaces the page in the old section with the smallest reference count.

One limitation of the FBR algorithm is that the algorithm must periodically resize (re-scale) all the reference counts to prevent cache pollution due to stale pages with high reference count but no recent usage. The FBR algorithm also has several tunable parameters: the size of all three sections, and two other parameters $C_{max}$ and $A_{max}$ that control periodic resizing. Much like the LRU-2 and 2Q algorithms, different values of these tunable parameters may be suitable for different workloads or for different cache sizes. The performance of the FBR algorithm is similar to that of the LRU-2 and 2Q algorithms.

Another replacement policy that combines the concepts of recency, LRU, and frequency, LFU, is the Least Recently/Frequently Used (LRFU) algorithm. the LRFU algorithm initially assigns a value $C(x)=0$ to every page x, and, at every time t, updates as:

$C(x)=1+2^{-\lambda}C(x)$ if $x$ is referenced at time $t$;

$C(x)=2^{-\lambda}C(x)$ otherwise, where $\lambda$ is a tunable parameter.

This update rule is a form of exponential smoothing that is widely used in statistics. The LRFU policy is to replace the page with the smallest $C(x)$ value. Intuitively, as $\lambda$ approaches 0, the C value is simply the number of occurrences of page x and LRFU collapses to LFU. As $\lambda$ approaches 1, the C value emphasizes recency and the LRFU algorithm collapses to LRU. The performance of the algorithm depends crucially on the choice of $\lambda$.

A later adaptive version, the Adaptive LRFU (ALRFU) algorithm, dynamically adjusts the parameter $\lambda$. Still, the LRFU the LRFU algorithm has two fundamental limitations that hinder its use in practice:

1. LRFU and ALRFU both require an additional tunable parameter for controlling correlated references. The choice of this parameter affects performance of the replacement policy.
2. The implementation complexity of LRFU fluctuates between constant and logarithmic in cache size per request.

However, the practical complexity of the LRFU algorithm is significantly higher than that of even the LRU-2 algorithm. For small values of $\lambda$, the LRFU algorithm can be as much as 50 times slower than LRU. Such overhead can potentially wipe out the entire benefit of a higher hit ratio.

Another replacement policy behaves as an expert master policy that simulates a number of caching policies. At any given time, the master policy adaptively and dynamically chooses one of the competing policies as the "winner" and switches to the winner. Rather than develop a new caching policy, the master policy selects the best policy amongst various competing policies. From a practical standpoint, a limitation of the master policy is that it must simulate all competing policies, consequently requiring high space and time overhead.

What is therefore needed is a replacement policy with a high hit ratio and low implementation complexity. Real-life workloads possess a great deal of richness and variation and do not admit a one-size-fits-all characterization. They may contain long sequential I/Os or moving hot spots. The frequency and scale of temporal locality may also change with time. They may fluctuate between stable repeating access patterns and access patterns with transient clustered references. No static, a priori fixed replacement policy will work well over such access patterns. Thus, the need for a cache replacement policy that adapts in an online, on-the-fly fashion to such dynamically evolving workloads while performing with a high hit ratio and low overhead has heretofore remained unsatisfied.

SUMMARY OF THE INVENTION

The present invention satisfies this need, and presents a system, a computer program product, and associated method (collectively referred to herein as "the system" or "the present system") for implementing an adaptive replacement cache policy. The present system maintains two LRU lists of pages that constitute a cache directory.

One list, $L_1$, contains pages seen (or requested) only once "recently," while the other list, $L_2$, contains pages seen at least twice "recently." The items seen twice within a short time have a low inter-arrival rate and are considered "high-frequency." Consequently, list $L_1$ captures "recency" while list $L_2$ captures "frequency." Each list contains pages in cache and pages in a cache directory. These two lists are kept to roughly the same size as the cache size c. Together, the two lists remember approximately twice the number of pages that would fit in the cache, but store c pages in the cache. While all pages in lists $L_1$ and $L_2$ are in the cache directory only at most c pages are actually in the cache.

At any time, the present system selects a variable number of most recent pages to keep from lists $L_1$ and $L_2$. The precise number of pages drawn from each list is a tunable parameter that is adaptively and continually tuned. Let $FRC_p$ denote a fixed replacement policy that attempts to keep the p most recent pages in list $L_1$, and c–p most recent pages in list $L_2$, in cache at all times, where c is the cache size.

At any given time, the present system behaves like $FRC_p$ for some fixed p. However, the system may behave like the fixed replacement policy $FRC_p$ at one time, and like the fixed replacement policy $FRC_q$ at some other time, where p is different than q. An important feature of the present system is to adaptively decide, in response to an evolving workload, how many top pages from each of the two lists $L_1$ and $L_2$, to maintain in the cache at any given time.

The present system achieves such online, on-the-fly adaptation by using a learning rule that allows the system to track a workload quickly and effectively. The effect of the learning rule is to induce a "random walk" on the parameter p. By learning from the recent past, the system keeps those pages in the cache that have the greatest likelihood of being used in the near future. It acts as a filter to detect and track temporal locality. For example, if during some part of the workload recency becomes important, then the present system will detect the change and configure itself to exploit the opportunity.

The present system is dynamically, adaptively, and continually balancing between recency and frequency in an online and self-tuning fashion in response to evolving and possibly changing access patterns. The system is also scan-resistant in that it allows one-time-only sequential read requests to pass through the cache without flushing pages that have temporal locality. The present system also effectively handles long periods of low temporal locality. The space overhead of the system can be for example, 0.75% of the cache size, which is considered relatively low overhead.

The present system is generally as effective as the $FRC_p$ policy even when the $FRC_p$ policy uses the best offline workload dependent choice for the parameter p. In this sense, the present system is empirically universal. In addition, the present system, which is completely online, delivers performance comparable to the LRU-2, 2Q, LRFU, and LIRS algorithms or policies, even when these policies use the best tuning parameters selected in an offline fashion.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 1 is a schematic illustration of an exemplary operating environment in which an adaptive replacement cache policy system can be used;

FIG. 2 is a diagram showing two variable size lists that are maintained by a simplified embodiment of the adaptive replacement cache system of FIG. 1;

DETAILED DESCRIPTION OF PREFERRED EMBODIMENTS

Figure 3:
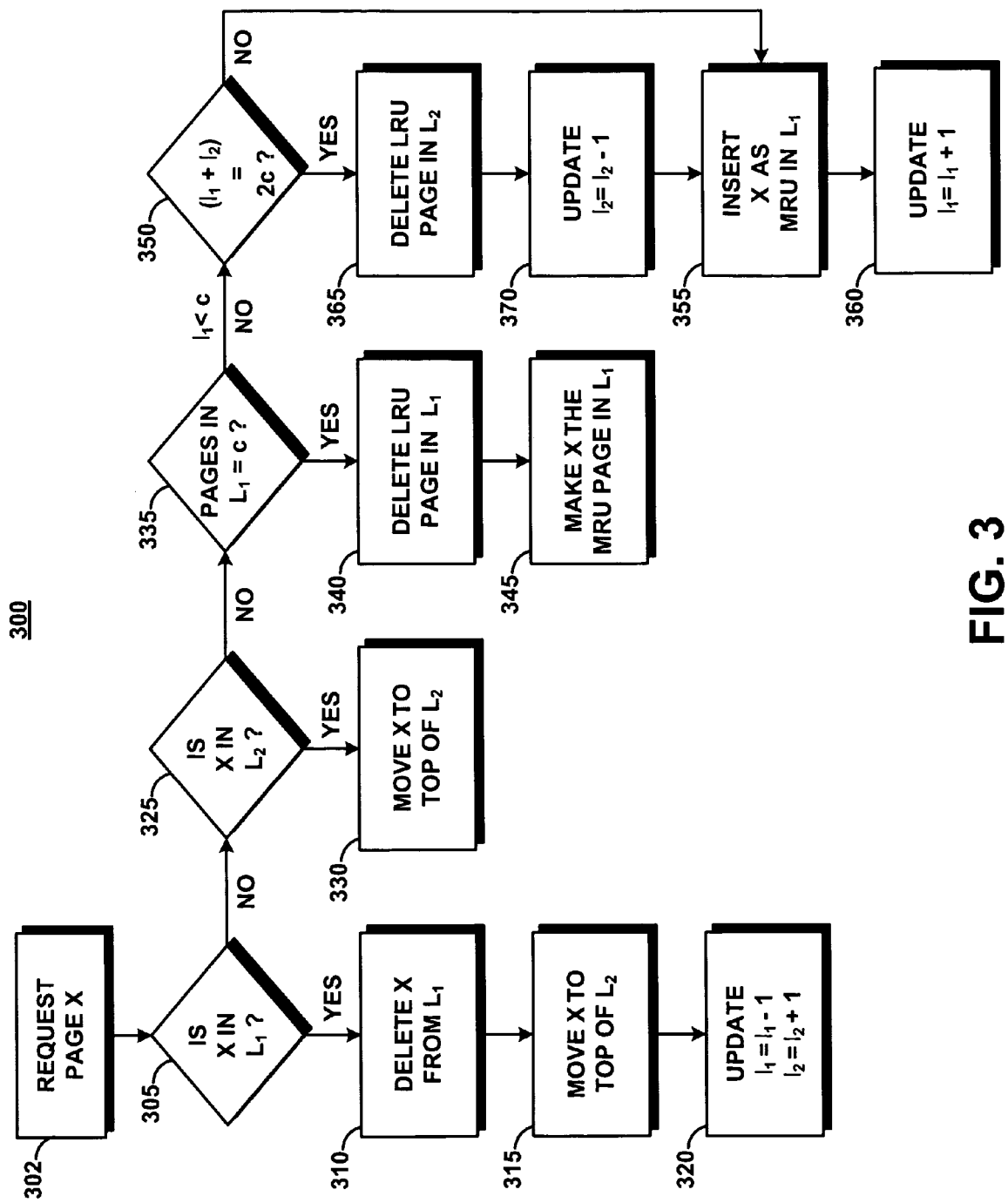
FIG. 3 is a process flowchart illustrating a method of operation of the simplified embodiment of the adaptive replacement cache system of FIG. 2.

The following definitions and explanations provide background information pertaining to the technical field of the present invention, and are intended to facilitate the understanding of the present invention without limiting its scope:

Cache: A temporary storage area for frequently-accessed or recently-accessed data. Having certain data stored in cache speeds up the operation of the processor.

Cache Hit: A successful retrieval of data from a cache.

Cache Miss: A failure to find requested data in the cache; consequently, the slower auxiliary memory must be searched.

Empirically Universal: Performing as well as a cache system whose tunable parameter is fixed a priori to match a workload with known characteristics and to match a given cache size.

Hit Ratio: The frequency at which a page is found in the cache as opposed to finding the page in the auxiliary memory.

Miss Ratio: The frequency at which pages must be paged into the cache from the auxiliary memory.

Online: Requiring no a priori knowledge about the page reference stream or the workload and responding to a changing and evolving workload by observing it.

Page: Uniformly sized objects, items, or block of memory in cache and auxiliary memory.

Workload: A sequence of pages requests.

FIG. 1 illustrates an exemplary high-level architecture of a computer memory system 100 comprising an adaptive replacement cache policy system 10 that utilizes, a cache 15 and an auxiliary memory 20. System 10 includes a software programming code or computer program product that is typically embedded within, or installed on a computer. Alternatively, system 10 can be saved on a suitable storage medium such as a diskette, a CD, a hard drive, or like devices.

The design of system 10 presents a new replacement policy. This replacement policy manages twice the number of pages present in cache 15 (also referred to herein as DBL(2c)). System 10 is derived from a fixed replacement policy that has a tunable parameter. The extrapolation to system 10 transforms the tunable parameter to one that is automatically adjusted by system 10.

The present cache replacement policy DBL(2c) manages and remembers twice the number of pages present in the cache 15, where c is the number of pages in a typical cache 15. As seen in FIG. 2, the cache replacement policy DBL(2c) maintains two variable-sized lists $L_1$ 205 and $L_2$ 210.

List $L_1$ 205 contains pages requested only once recently, and establishes the recency aspect of page requests. List $L_2$ 210 contains pages requested at least twice recently, and establishes the frequency aspect of page requests. The pages are sorted in each list from most recently used, MRU, to least recently used, LRU, as shown by the arrows in list $L_1$ 205 and list $L_2$ 210.

The present cache replacement policy DBL(2c) replaces the LRU page in list $L_1$ 205 if list $L_1$ 205 contains exactly c pages; otherwise, it replaces the LRU page in list $L_2$ 210. The method of operation 300 for the cache replacement policy DBL(2c) is further shown FIG. 3. The policy attempts to keep both lists $L_1$ and $L_2$ to contain roughly c pages.

Given that a page X is requested at block 302, the cache replacement policy DBL(2c) first determines at decision block 305 whether input page X exists in list $L_1$ 205. If so, then page X has recently been seen once, and is moved from the recency list, $L_1$ 205, to the frequency list, $L_2$ 210. The cache replacement policy DBL(2c) deletes page X from list $L_1$ 205 at block 310 and moves page X to the top of list $L_2$ 210 at block 315.

Page X is now the most recently requested page in list $L_2$ 210, so it is moved to the top of this list. At block 320, the cache replacement policy DBL(2c) of system 10 updates the number of pages in each list as shown, where $l_1$ is the number of pages in list $L_1$ 205, and $l_2$ is the number of pages in list $L_2$ 210. The total number of pages in the cache replacement policy DBL(2c) is still at most 2c, since a page was simply moved from list $L_1$ 205 to list $L_2$ 210.

If at decision block 305 page X was not found in list $L_1$ 205, the cache replacement policy DBL(2c) determines, at decision block 325, if page X is in list $L_2$ 210. If so, page X is now the most recently requested page in list $L_2$ 210 and the cache replacement policy DBL(2c) moves it to the top of the list at block 330. If page X is in neither list $L_1$ 205 nor list $L_2$ 210, it is a miss and the cache replacement policy DBL(2c) must decide where to place page $X_t$.

The sizes of the two lists can fluctuate, but the cache replacement policy DBL(2c) wishes to maintain, as closely as possible, the same number of pages in list $L_1$ 205 and list $L_2$ 210, maintaining the balance between recency and frequency. If there are exactly c pages in list $L_1$ 205 at decision block 335, the cache replacement policy DBL(2c) deletes the least recently used (LRU) page in list $L_1$ 205 at block 340, and makes page X the most recently used (MRU) page in list $L_1$ 205 at block 345.

If the number of pages $l_1$ in list $L_1$ 205 is determined at decision block 335 to be less than c, the cache replacement policy DBL(2c) determines at decision block 350 if the cache 15 is full, i.e., whether $l_1+l_2=2c$. If not, the cache replacement policy DBL(2c) inserts page X as the MRU page in list $L_1$ 205 at block 355, and adds one to $l_1$, the number of pages in list $L_1$ 205, at block 360. If the cache 15 is determined to be full at decision block 350, the cache replacement policy DBL(2c) deletes the LRU page in list $L_2$ 210 at block 365 and subtracts one from $l_2$, the number of pages in list $L_2$ 210.

Having made room for a new page, the cache replacement policy DBL(2c) then proceeds to blocks 355 and 360, inserting X as the MRU page in $L_1$ 205 and adding one to $l_1$, the number of pages in list $L_1$ 205. Pages can only be placed in list $L_2$ 210, the frequency list, by moving them from list $L_1$ 205, the recency list. New pages are always added to list $L_1$ 205.

The method 300 of system 10 is based on the following code outline:

```
if (L1->hit(page)){
        L1->delete(page);
        L2->insert_mru(page);
}
else if (L2->hit(page)){
        L2->delete(page);
        L2->insert_mru(page);
}
else if (L1->length( )==c){
        L1->delete_lru( );
        L1->insert_mru(page);
}
else{
        if(L1->length( ) + L2->length( )==2*c){
                L2->delete_lru( );
        }
        L1->insert_mru(page);
}
```

Based on the performance of the cache replacement policy DBL(2c) in method 300 of FIG. 3, it can be seen that even though the sizes of the two lists $L_1$ 205 and $L_2$ 210 fluctuate, the following is always true:

$0<(l_2+l_1)\leq 2c;$ $0\leq l_1\leq c;$ and $0\leq l_2\leq 2c.$

In addition, the replacement decisions of the cache replacement policy DBL(2c) at blocks 335 and 350 equalize the sizes of two lists. System 10 is based on method 300 shown of FIG. 3. System 10 contains demand paging policies that track all 2c items that would have been in a cache 15 of size 2c managed by the cache replacement policy DBL(2c), but physically keeps only (at most) c of those pages in the cache 15 at any given time.

Figure 4:
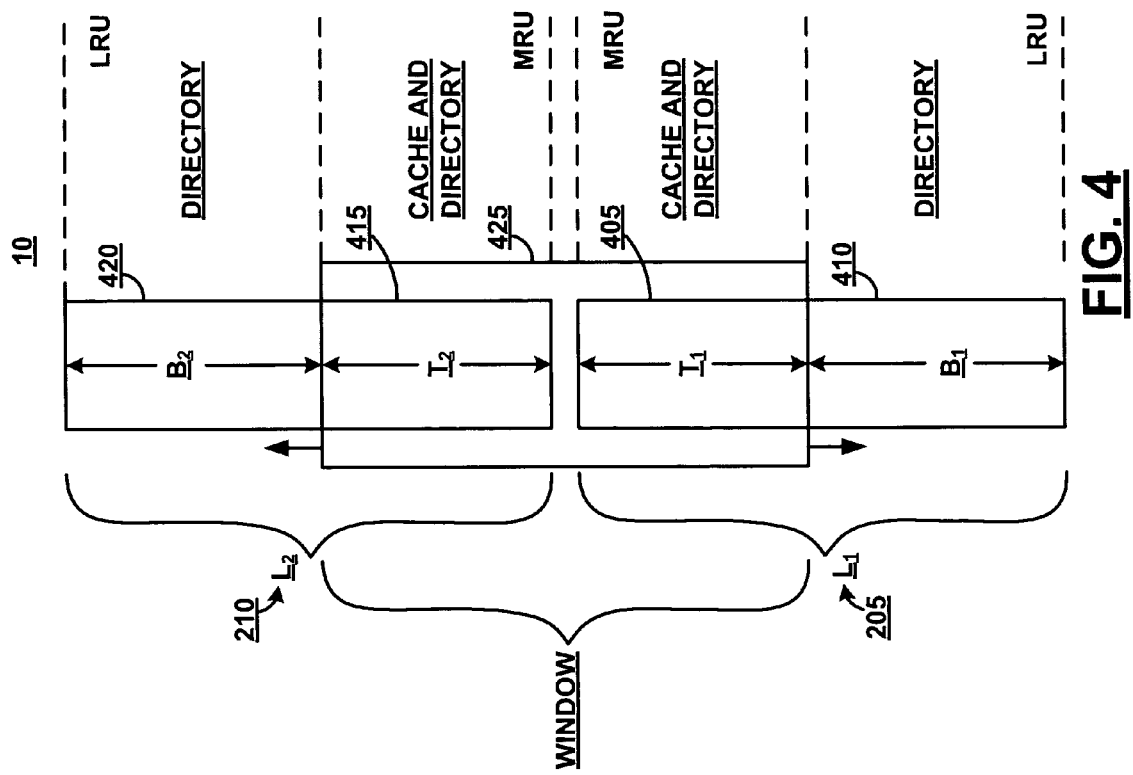
FIG. 4 is a diagram illustrating the operation of the adaptive replacement cache system of FIG. 1, showing the two variable size lists of FIG. 2 divided into a cache portion and a directory, with the cache portions performing like a floating or self-optimizing window within the two lists.
Figure 5A:
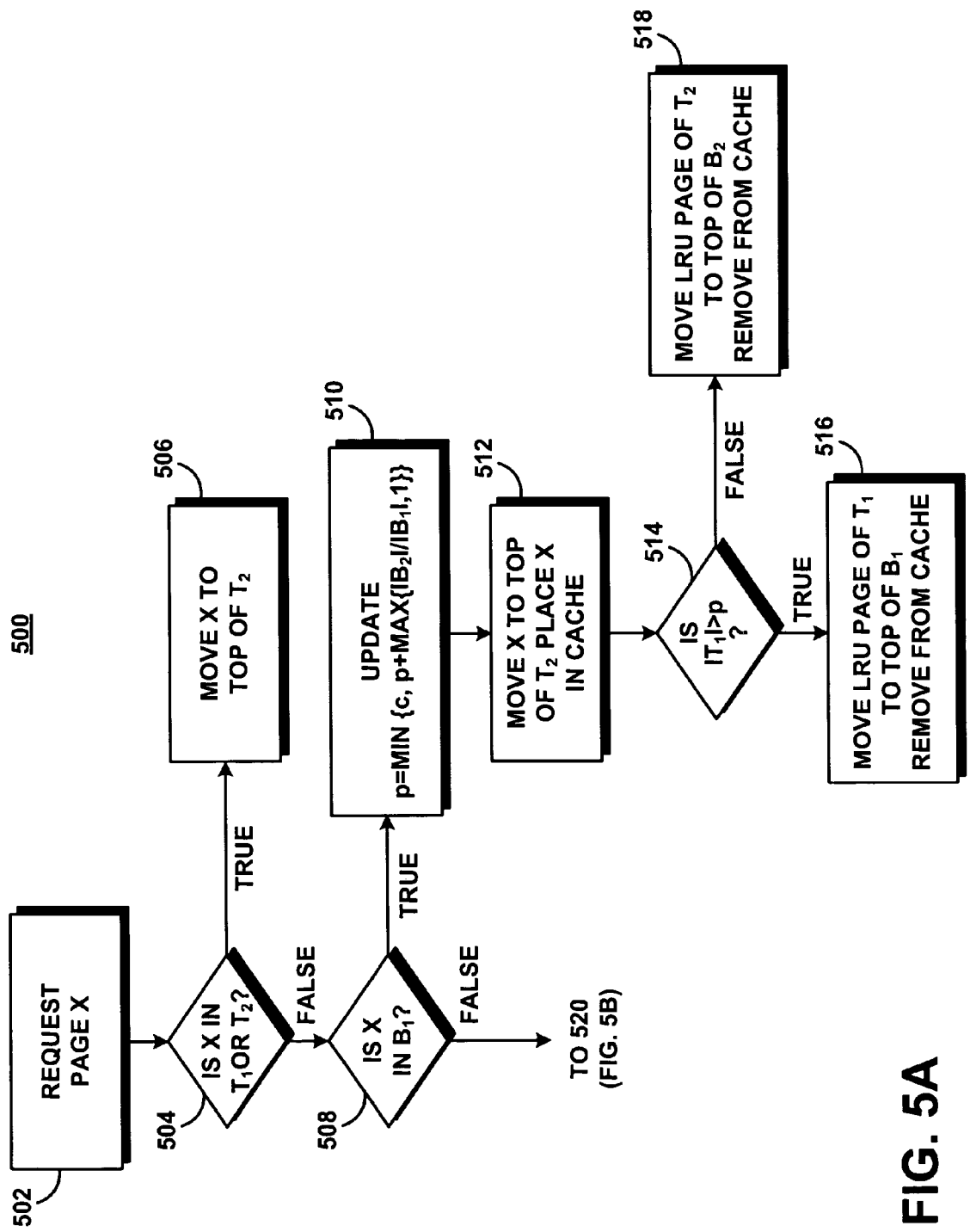
FIG. 5 is comprised of FIGS. 5A, 5B, 5C, 5D, and represents a process flow chart illustrating a method of operation of the adaptive replacement cache system of FIG. 1.
Figure 5B:
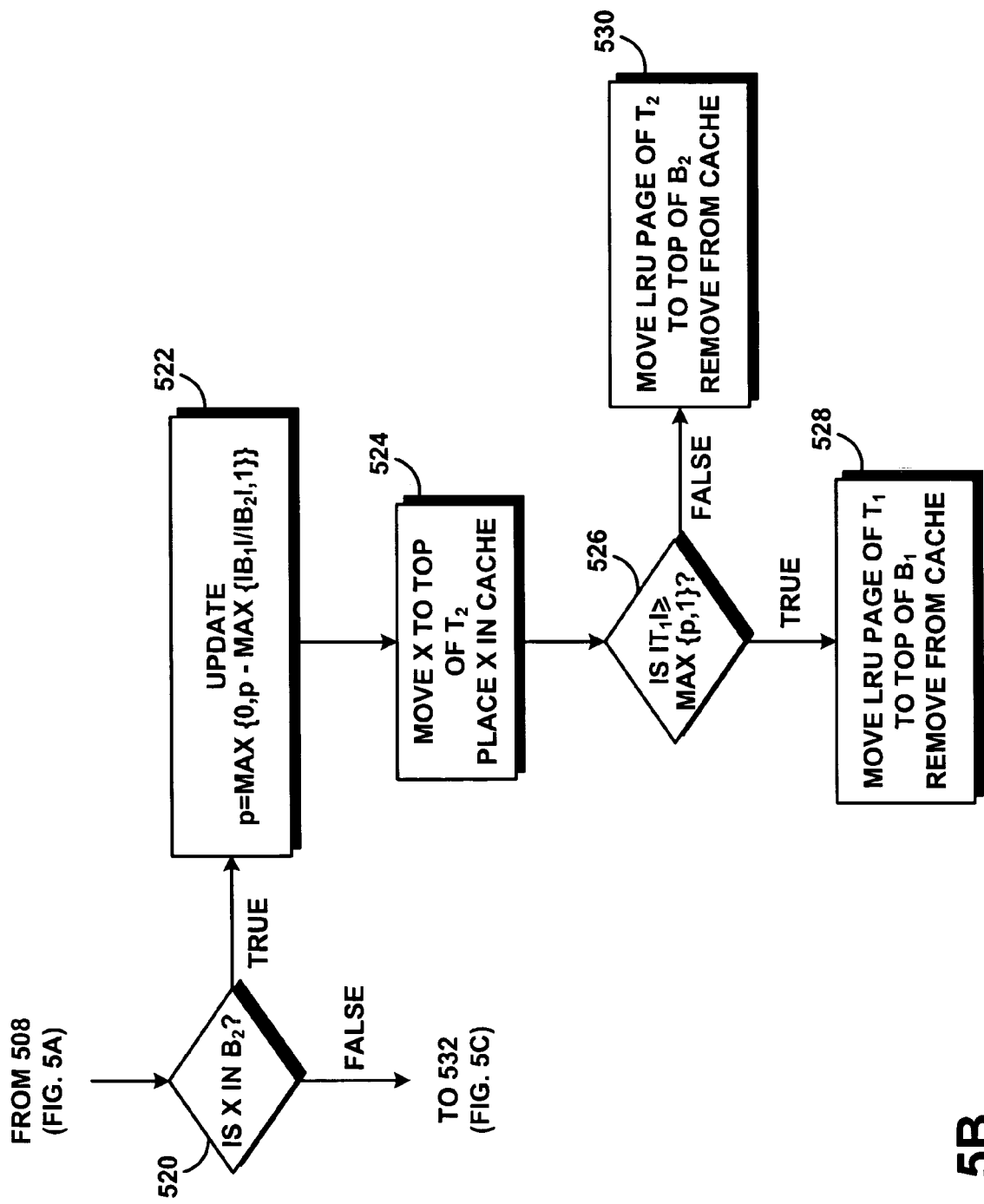
Figure 5C:
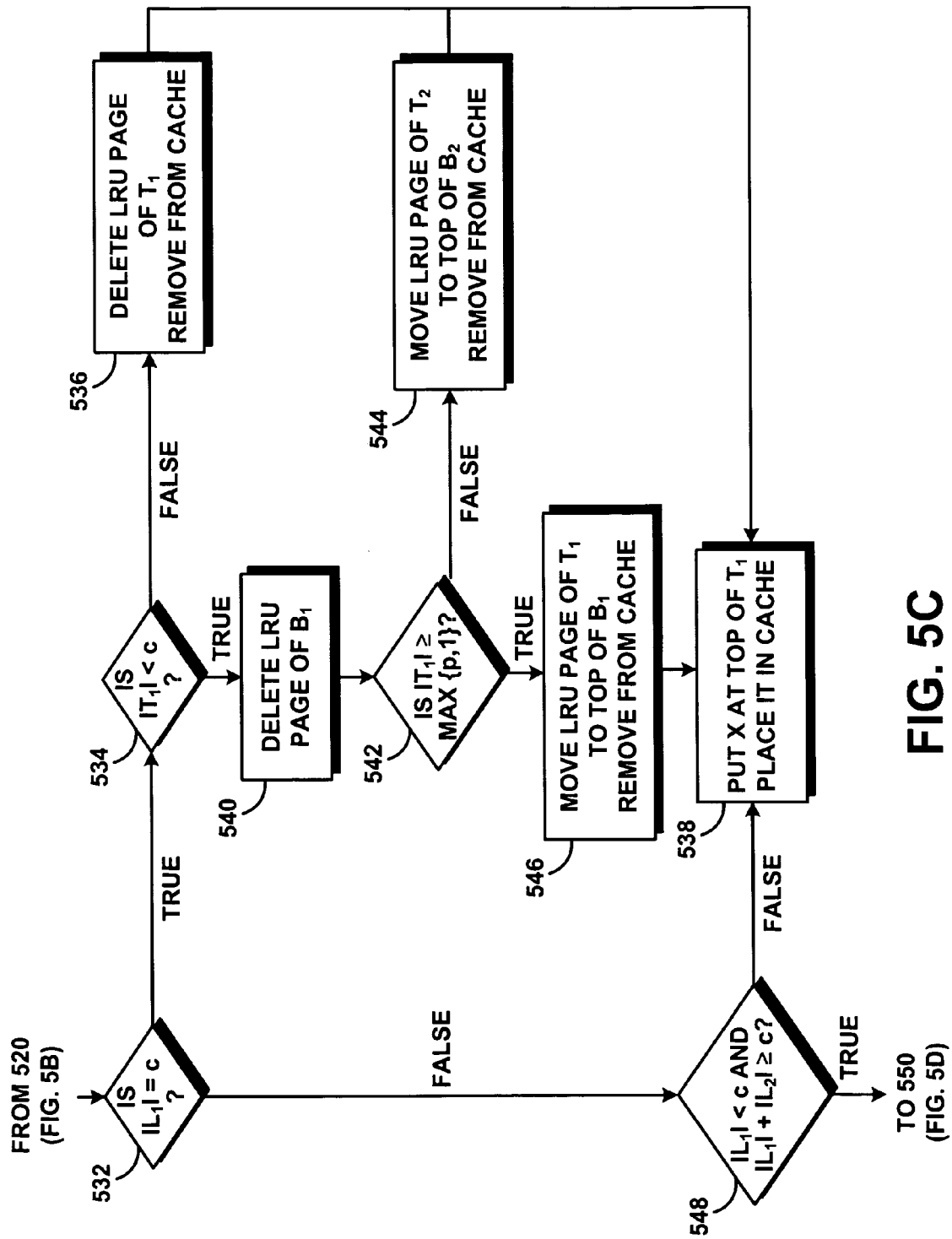
Figure 5D:
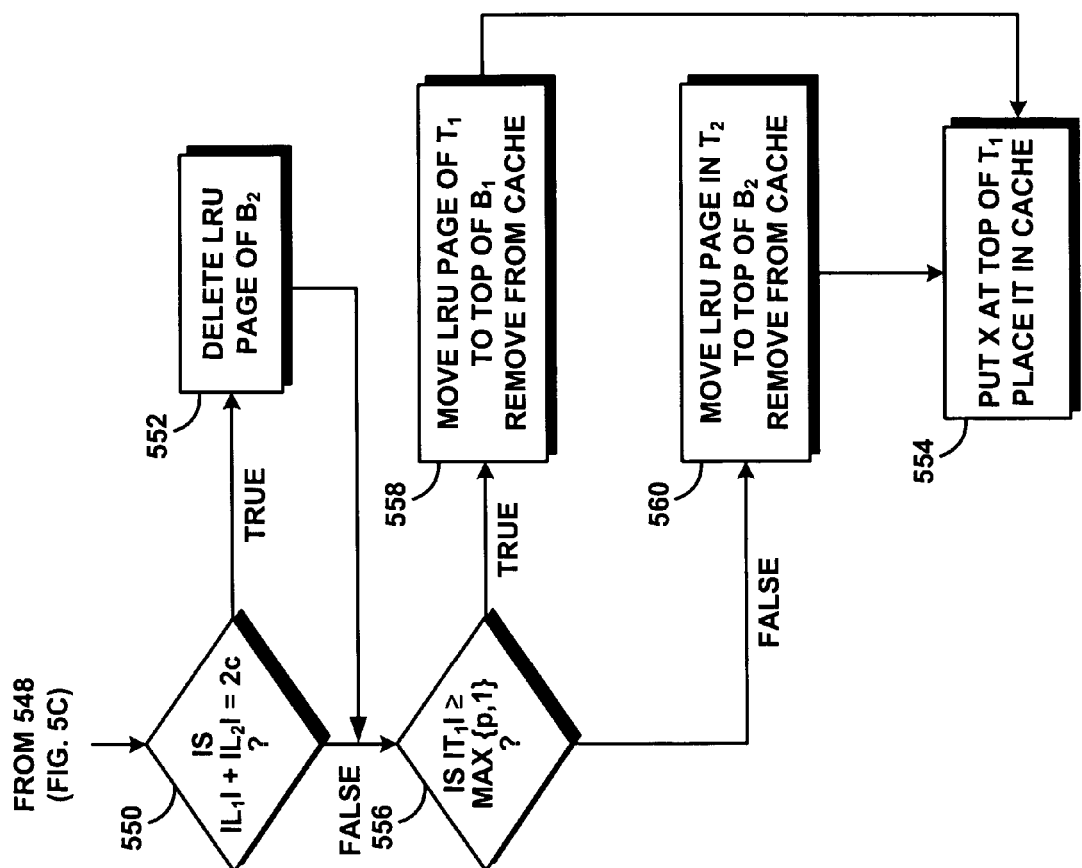

With further reference to FIG. 4, system 10 introduces the concept of a "dynamic" or "sliding" window 425. To this end, the window 425 has a capacity c, and divides the list $L_1$ into two dynamic portions $B_1$ 410 and $T_1$ 405, and further divides the list $L_2$ into two dynamic portions $B_2$ 420 and $T_2$ 415. These dynamic list portions meet the following conditions:

1. List portions $T_1$ 405 and $B_1$ 410 are disjoint, as are list portions $T_2$ 415 and $B_2$ 420.

2. List $L_1$ 205 is comprised of list portions $B_1$ 410 and $T_1$ 405, as follows:

$L_1$ 205=[$T_1$ 405∪ $B_1$ 410]

3. List $L_2$ 210 is comprised of list portions $B_2$ 420 and $T_2$ 415, as follows:

$L_2$ 210=[$T_2$ 415∪ $B_2$ 420].

4. If the number of pages $l_1+l_2$ in lists $L_1$ and $L_2$ is less than c, then the list portions $B_1$ 410 and $B_2$ 420 are empty, as expressed by the following expression:

If $|L_1 \text{ 205}| \cup |L_2 \text{ 210}| < c$, then both $B_1$ 410 and $B_2$ 420 are empty.
5. If the number of pages $l_1+l_2$ in lists $L_1$ and $L_2$ is greater than, or equal to c, then the list portions $T_1$ 405 and $T_2$ 415 together contain exactly c pages, as expressed by the following If $|L_1 \text{ 205}| \cup |L_2 \text{ 210}| \geq c$, then $T_1$ 405 and $T_2$ 415 contain exactly c pages.
6. Either list portion $T_1$ 405 is empty or list portion $B_1$ 410 is empty or the LRU page in list portion $T_1$ 405 is more recent than the MRU page in list portion $B_1$ 410. Similarly, either list portion $T_2$ 415 is empty or list portion $B_2$ 420 is empty or the LRU page in list portion $T_2$ 415 is more recent than the MRU page in list portion $B_2$ 420. In plain words, every page in $T_1$ is more recent than any page in $B_1$ and every page in $T_2$ is more recent than any page in $B_2$.
7. For all traces and at each time, pages in both list portions $T_1$ 405 and $T_2$ 415 are exactly the same pages that are maintained in cache 15.

The foregoing conditions imply that if a page in list portion $L_1$ 205 is kept, then all pages in list portion $L_1$ 205 that are more recent than this page must also be kept in the cache 15. Similarly, if a page in list portion $L_2$ 210 is kept, then all pages in list portion $L_2$ 210 that are more recent than this page must also be kept in the cache 15. Consequently, the cache replacement policy that satisfies the above seven conditions "skims the top (or most recent) few pages" in list portion $L_1$ 205 and list portion $L_2$ 210.

If a cache 15 managed by the cache replacement policy of system 10 is full, that is if: $|T_1 \cup T_2|=c$, then it follows from the foregoing conditions that, for any trace, on a cache 15 miss only two actions are available to the cache replacement policy:
1. either replace the LRU page in list portion $T_1$ 405, or
2. replace the LRU page in list portion $T_2$ 415.

The pages in $|T_1 \cup T_2|$ are maintained in the cache 15 and a directory; and are represented by the window 425. The pages in list portions $B_1$ 410 and $B_2$ 420 are maintained in the directory only and not in the cache.

With reference to FIG. 3, the "c" most recent pages will always be contained in the cache replacement policy DBL (2c), which, in turn, deletes either the LRU item in list $L_1$ 205 (block 340) or the LRU item in list $L_2$ 210 (block 365). In the first case, list $L_1$ 205 must contain exactly c items (block 335), while in the latter case, list $L_2$ 210 must contain at least c items (bock 350). Hence, the cache replacement policy DBL(2c) does not delete any of the most recently seen c pages, and always contains all pages contained in a LRU cache 15 with c items. Consequently, there exists a dynamic partition of lists $L_1$ 205 and $L_2$ 210 into list portions $T_1$ 405, $B_1$ 410, $T_2$ 415, and $B_2$ 420, such that the foregoing conditions are met.

The choice of 2c as the size of the cache 15 directory for the cache replacement policy DBL(2c) will now be explained. If the cache replacement policy DBL(2c') is considered for some positive integer c'<c, then the most recent c pages need not always be in the cache replacement policy DBL(2c'). For example, consider the trace:
1,2, . . ., c,1,2, . . ., c, . . . ,1,2, . . .,c . . . .

For this trace, the hit ratio of LRU(c) approaches 1 as the size of the trace increases, but the hit ratio of the cache replacement policy DBL(2c'), for any c'<c, is zero.

The design of the cache replacement policy DBL(2c) can be expanded to a replacement policy $FRC_p(c)$ for fixed replacement cache. This policy $FRC_p(c)$ has a tunable or self-adjusting parameter p, where $0<p\leq c$, and satisfies the foregoing seven conditions. In addition, the policy $FRC_p(c)$ satisfies a crucial new condition, namely to keep exactly p pages in the list portion $T_1$ 405 and exactly (c–p) pages in the list portion $T_2$ 415. In other terms, the policy $FRC_p(c)$ attempts to keep exactly the MRU p top pages from the list portion $L_1$ 205 and the MRU (c–p) top pages from the list portion $L_2$ 210 in the cache 15, wherein p is the target size for the list.

The replacement policy $FRC_p(c)$ is expressed as follows:
1. If $|T_1 \text{ 405}|>p$, replace the LRU page in list portion $T_1$ 405.
2. If $|T_1 \text{ 405}|<p$, replace the LRU page in list portion $T_2$ 415.
3. If $|T_1 \text{ 405}|=p$ and the missed page is in list portion $B_1$ 410, replace the LRU page in list portion $T_2$ 415. Similarly, if list portion $|T_2 \text{ 405}|=P$ and the missed page is in list portion $B_2$ 420, replace the LRU page in list portion $T_1$ 405.

Replacement decision 3 above can be optional or it can be varied if desired.

System 10 is an adaptive replacement policy based on the design of the replacement policy $FRC_p(c)$. At any time, the behavior of system 10 is described once a certain adaptation parameter $p \in [0, c]$ is known. For a given value of the parameter p, system 10 behaves exactly as the replacement policy $FRC_p(c)$. However, unlike the replacement policy $FRC_p(c)$, system 10 does not use a single fixed value for the parameter p over the entire workload. System 10 continuously adapts and tunes p in response to the observed workload.

System 10 dynamically detects, in response to an observed workload, which item to replace at any given time. Specifically, on a cache miss, system 10 adaptively decides whether to replace the LRU page in list portion $T_1$ 405 or to replace the LRU page in list portion $T_2$ 415, depending on the value of the adaptation parameter p at that time. The adaptation parameter p is the target size for the list portion $T_1$ 405. A preferred embodiment for dynamically tuning the parameter p is now described.

Method 500 of system 10 is described by the logic flowchart of FIG. 5 (FIGS. 5A, 5B, 5C, 5D). At block 502, a page X is requested from cache 15. System 10 determines at decision block 504 if page X is in ($T_1$ 405 $\cup$ $T_2$ 415). If so, then page X is already in cache 15, a hit has occurred, and at block 506 system 10 moves page X to the top of list portion $T_2$ 415, the MRU position in the frequency list.

If however, the result at block 504 is false, system 10 ascertains whether page X is in list portion $B_1$ 410 at block 508. If so, a miss has occurred in cache 15 and a hit has occurred in the recency directory of system 10. In response, system 10 updates the value of the adaptation parameter, p, at block 510, as follows:

$p=\min\{c, p+\max\{|B_2|/|B_1|,1\}\}$, where $|B_2|$ is the number of pages in the list portion $B_2$ 420 directory and $|B_1|$ is the number of pages in the list portion $B_1$ 410 directory.

System 10 then proceeds to block 512 and moves page X to the top of list portion $T_2$ 415 and places it in cache 15. Page X is now at the MRU position in list portion $T_2$ 415, the list that maintains pages based on frequency. At decision block 514, system 10 evaluates |T₁ 405|>p. If the evaluation is true, system 10 moves the LRU page of list portion T₁ 405 to the top of list portion B₁ 410 and removes that LRU page from cache 15 at block 516. The LRU page in the recency portion of cache 15 has moved to the MRU position in the recency directory.

Otherwise, if the evaluation at step 514 is false, system 10 moves the LRU page of list portion T₂ 415 to the top of list portion B₂ 420 and removes that LRU page from cache 15 at block 518. In this case, the LRU page of the frequency portion of cache 15 has moved to the MRU position in the frequency directory. System 10 makes these choices to balance the sizes of list portion L₁ 205 and list portion L₂ 210 while adapting to meet workload conditions.

Returning to decision block 508, if page X is not in B₁, system 10 continues to decision block 520 (shown in FIG. 5B) to evaluate if page X is in B₂. If this evaluation is true, a hit has occurred in the frequency directory of system 10. System 10 proceeds to block 522 and updates the value of the adaptation parameter, p, as follows:

$$p = \max\{0, p - \max\{|B_1|/|B_2|, 1\}\}$$

where |B₂| is the number of pages in the list portion B₂ 420 directory and |B₁| is the number of pages in the list portion B₁ 410 directory. System 10 then, at block 524, moves page X to the top of list portion T₂ 415 and places it in cache 15. Page X is now at the MRU position in list portion T₂ 415, the list that maintains pages based on frequency.

System 10 must now decide which page to remove from cache 15. At decision block 526, system 10 evaluates |T₁ 405|≧max {p, 1}. If the result is true, system 10 moves the LRU page of list portion T₁ 405 to the top of list portion B₁ 410 and removes that LRU page from cache 15 at block 528. Otherwise, system 10 moves the LRU page of list portion T₂ 415 to the top of list portion B₂ 420 and removes that LRU page from cache 15 at block 530.

If at decision block 520 X is not in B₂ 420, the requested page is not in cache 15 or the directory. More specifically, the requested page is a system miss. System 10 then must determine which page to remove from cache 15 to make room for the requested page. Proceeding to FIG. 5C, system 10 evaluates at decision block 532 |L₁|=c. If the result is true, system 10 then evaluates at decision block 534 |T₁|<c.

If the result of the evaluation at block 534 is false, then system 10 deletes the LRU page of list portion T₁ 405 and removes it from cache 15, block 536. System 10 then puts the requested page X at the top of list portion T₁ 405 and places it in cache 15 at block 538.

Returning to decision block 534, if the result is true, system 10 proceeds to block 540 and deletes the LRU page of list portion B₁ 410. At decision block 542, system 10 evaluates |T₁|≧max {p, 1}. If the result is false, system 10 moves the LRU page of list portion T₂ 415 to the top of list portion B₂ 420 and removes that LRU page from cache 15 at block 544. System 10 then puts the requested page X at the top of list portion T₁ 405 and places it in cache 15 at block 538.

If the result at decision block 542 is true, system 10 moves the LRU page of list portion T₁ 405 to the top of list portion B₁ 410 and removes that LRU page from cache 15 at block 546. System 10 then puts the requested page X at the top of list portion T₁ 405 and places it in cache 15 at block 538.

Returning now to decision block 532, if the result is false, system 10 proceeds to decision block 548 and evaluates the following condition:

$$|L_1\ 205| < c \text{ and } |L_1\ 205| + |L_2\ 210| \geq c.$$

If the result is false, system 10 puts the requested page X at the top of list portion T₁ 405 and places it in cache 15 at block 538. If, however, the result is true, system 10 proceeds to decision block 550 (FIG. 5D) and evaluates |L₁|+|L₂|=2c. If the result is true, system 10 deletes the LRU page of list portion B₂ 420 at block 552. After this the system proceeds to decision block 556.

If the result at decision block 550 is false, system 10 evaluates |T₁|≧max {p, 1} at decision block 556. If the result is true, system 10 moves the LRU page of list portion T₁ 405 to the top of list portion B₁ 410, and removes that LRU page from cache 15 at block 558. System 10 then places the requested page X at the top of list portion T₁ 405 and places it in cache 15 at block 554. If the result at decision block 556 is false, system 10 moves the LRU page in list portion T₂ 415 to the top of list portion B₂ 420 and removes that LRU page from cache 15 at block 560. System 10 then places the requested page X at the top of list portion T₁ 405 and places it in cache 15 at block 554.

System 10 continually revises the parameter p in response to a page request miss or in response to the location of a hit for page x within list portion T₁ 405, list portion T₂ 415, list portion B₁ 410, or list portion B₂ 420. The response of system 10 to a hit in list portion B₁ 410 is to increase the size of T₁ 405. Similarly, if there is a hit in list portion B₂ 420, then system 10 increases the size of list portion T₂ 415. Consequently, for a hit on list portion B₁ 410 system 10 increases p, the target size of list portion T₁ 405; a hit on list portion B₂ 420 decreases p. When system 10 increases p, the size of list portion T₁ 405, the size of list portion T₂ 415 (c−p) implicitly decreases.

The precise magnitude of the revision in p is important. The precise magnitude of revision depends upon the sizes of the list portions B₁ 410 and B₂ 420. On a hit in list portion B₁ 410, system 10 increments p by:

$$\max\{|B_2|/|B_1|, 1\}$$

subject to the cap of c, where |B₂| is the number of pages in the list portion B₂ 420 directory and |B₁| is the number of pages in the list portion B₁ 410 directory; the minimum revision is by 1 unit. Similarly, on a hit in list portion B₂ 420, system 10 decrements p by:

$$\min\{|B_1|/|B_2|, 1\}$$

subject to the floor of zero, where |B₂| is the number of pages in the list portion B₂ 420 directory and |B₁| is the number of pages in the list portion B₁ 410 directory; the minimum revision is by 1 unit.

If there is a hit in list portion B₁ 410, and list portion B₁ 410 is very large compared to list portion B₂ 420, then system 10 increases p very little. However, if list portion B₁ 410 is small compared to list portion B₂ 420, then system 10 increases p by the ratio |B₂|/|B₁|. Similarly, if there is a hit in list portion B₂ 420, and list portion B₂ 420 is very large compared to list portion B₁ 410, then system 10 increases p very little. However, if list portion B₂ 420 is small compared to list portion B₁ 410, then system 10 increases p by the ratio |B₁|/|B₂|. In effect, system 10 invests cache 15 resources in the list portion that is receiving the most hits.

Figure 6:
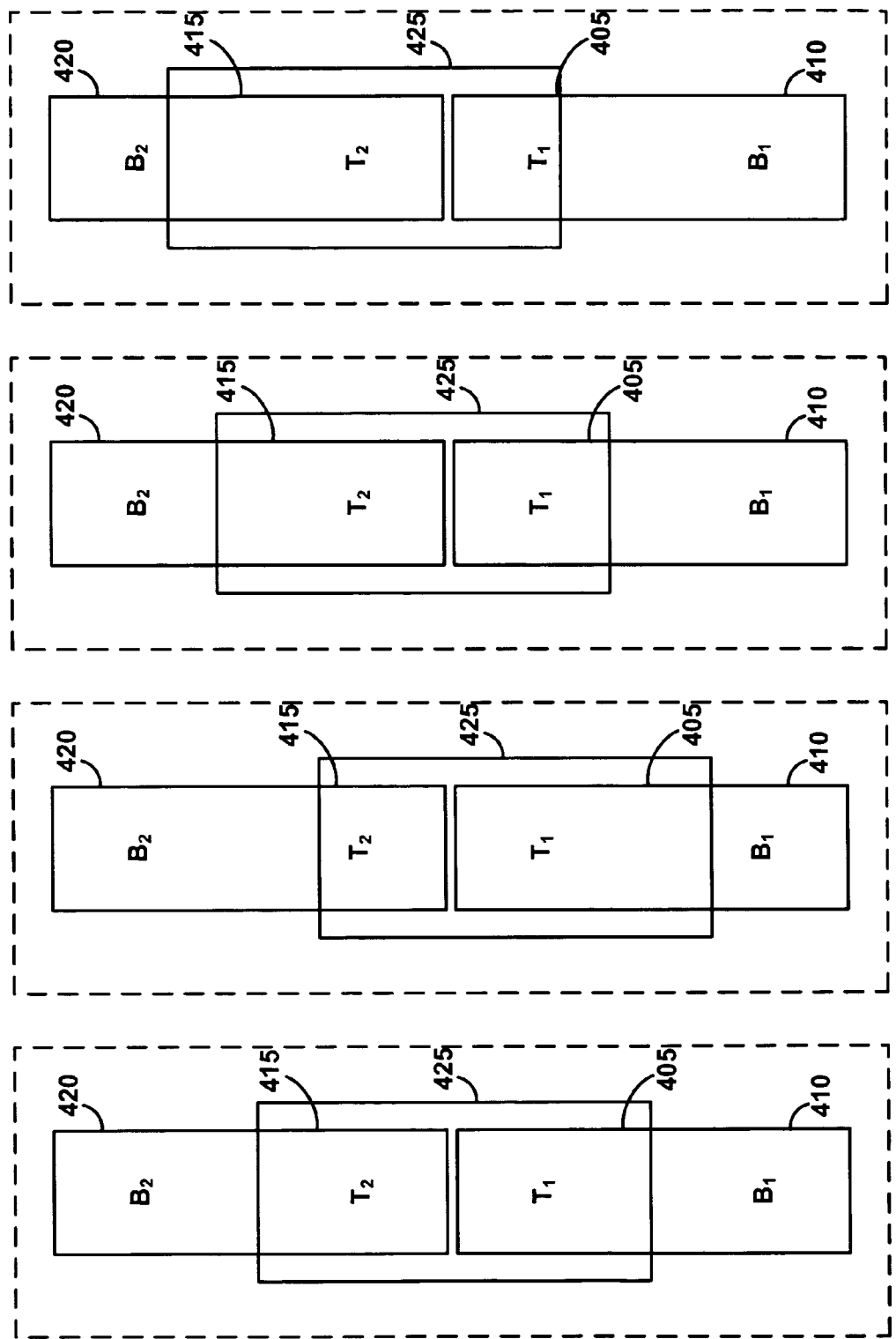
FIG. 6 is a diagram describing the movement of the floating window of FIG. 4 in use by the adaptive replacement cache system of FIG. 1.

Turning now to FIG. 6, the compound effect of a number of such small increments and decrements to p, induces a "random walk" on the parameter p. In effect, the window 425 slides up and down as the sizes of list portions T₁ 405 and T₂ 415 change in response to the workload. The window 425 is the number of pages in actual cache 15 memory.

In illustration A of FIG. 6, the list portions $T_1$ 405 and $T_2$ 415 together contain c pages and list portions $B_1$ 410 and $B_2$ 420 together contain c pages. In illustration B, a hit for page X is received in list portion $B_1$ 410. System 10 responds by increasing p, which increases the size of list portion $T_1$ 405 while decreasing the size of list portion $T_2$ 415. Window 425 effectively slides down. The distance window 425 moves in FIG. 6 is illustrative of the overall movement and is not based on actual values.

In the next illustration C of FIG. 6, one or more hits are received in list portion $B_2$ 420. System 10 responds by decreasing p, which decreases the size of list portion $T_1$ 405 while increasing the size of $T_2$ 415. Window 425 effectively slides up. Continuing with illustration D, another hit is received in list portion $B_2$ 420, so system 10 responds again by decreasing p and window 425 slides up again. If for example, a fourth hit is received in list portion $B_1$ 410, system 10 increases p, and window 425 slides down again as shown in illustration C. System 10 responds to the cache 15 workload, adjusting the sizes of list portions $T_1$ 405 and $T_2$ 415 to provide the maximum response to that workload.

One feature of the present system 10 is its resistance to scans, long streams of requests for pages not in cache 15. A page which is new to system 10, that is, not in $L_1 \cup L_2$, is placed in the MRU position of list $L_1$ 205 (block 538 and 554 of FIG. 5). From that position, the new page gradually makes its way to the LRU position in list $L_1$ 205. The new page does not affect list $L_2$ 210 before it is evicted, unless it is requested again. Consequently, a long stream of one-time-only reads will pass through list $L_1$ 205 without flushing out potentially important pages in list $L_2$ 210. In this case, system 10 is scan resistant in that it will only flush out pages in list portion $T_1$ 405 but not in list portion $T_2$ 415. Furthermore, when a scan begins, fewer hits will occur in list portion $B_1$ 410 than in list portion $B_2$ 420. Consequently, system 10 will continually decrease p, increasing list portion $T_2$ 415 at the expense of list portion $T_1$ 405. This will cause the one-time-only reads to pass through system 10 even faster, accentuating the scan resistance of system 10.

System 10 was tested using the traces of TABLE 1. OTLP is a standard test trace containing references to a CODASYL database. Traces P1 through P14 were collected from workstations to capture disk operations through the use of device filters. Page size used for these traces was 512 bytes. The trace ConCat (P1–P14) was obtained by concatenating the traces P1 through P14. Similarly, the trace Merge (P1–P14) was obtained by merging the traces P1 through P14 using time stamps on each of the requests. Concat (P1–P14) and Merge (P1–P14) simulated a workload seen by a small storage controller. The trace DS1 was taken off a small database server, and further a trace was captured using an SPC1-like synthetic benchmark. This benchmark contains long sequential scans in addition to random accesses. The page size for the SPC1-like trace was 4 Kbytes.

TABLE 1

Description of traces used to test System 10.

| Trace Name | Number of Requests | Unique Pages |
|---|---|---|
| OLTP | 914145 | 186880 |
| P1 | 32055473 | 2311485 |
| P2 | 12729495 | 913347 |
| P3 | 3912296 | 762543 |
| P4 | 19776090 | 5146832 |
| P5 | 22937097 | 3403835 |
| P6 | 12672123 | 773770 |

TABLE 1-continued

Description of traces used to test System 10.

| Trace Name | Number of Requests | Unique Pages |
|---|---|---|
| P7 | 14521148 | 1619941 |
| P8 | 42243785 | 977545 |
| P9 | 10533489 | 1369543 |
| P10 | 33400528 | 5679543 |
| P11 | 141528425 | 4579339 |
| P12 | 13208930 | 3153310 |
| P13 | 15629738 | 2497353 |
| P14 | 114990968 | 13814927 |
| ConCat (P1–14) | 490139585 | 47003313 |
| Merge (P1–14) | 490139585 | 47003313 |
| DS1 | 43704979 | 10516352 |
| SPC1 | 41351279 | 6050363 |

Table 2 compares the hit ratios of LRU, 2Q, LRU-2, LRFU, and LIRS policies with those of system 10 for trace P8. Table 3 compares the hit ratios of LRU, 2Q, LRU-2, LRFU, and LIRS policies with those of system 10 for trace P12. All hit ratios are recorded from the start when the cache is empty and hit ratios are reported in percentages. Tunable parameters for LRU-2, 2Q, and LRFU policies were selected offline by trying different parameters and selecting the parameters that provided the best results for different cache sizes. System 10 outperforms the LRU policy and performs close to the 2Q, LRU-2, LRFU, and LIRS policies even when these policies use the best offline parameters. The same general results continue to hold for all the traces examined.

TABLE 2

Hit ratio comparison of LRU, 2Q, LRU-2, LRFU, LIRS to System 10 for trace P8.

| Cache Size | LRU Online | System 10 Online | 2Q Offline | LRU-2 Offline | LRFU Offline | LIRS Offline |
|---|---|---|---|---|---|---|
| 1024 | 0.35 | 1.22 | 0.94 | 1.63 | 0.69 | 0.79 |
| 2048 | 0.45 | 2.43 | 2.27 | 3.01 | 2.18 | 1.71 |
| 4096 | 0.73 | 5.28 | 5.13 | 5.50 | 3.53 | 3.60 |
| 8192 | 2.30 | 9.19 | 10.27 | 9.87 | 7.58 | 7.67 |
| 16384 | 7.37 | 16.48 | 18.78 | 17.18 | 14.83 | 15.26 |
| 32768 | 17.18 | 27.51 | 31.33 | 28.86 | 28.37 | 27.29 |
| 65536 | 36.10 | 43.42 | 47.61 | 45.77 | 46.37 | 45.36 |
| 131072 | 62.10 | 66.35 | 69.45 | 67.56 | 66.60 | 69.65 |
| 262144 | 89.26 | 89.28 | 88.92 | 89.59 | 90.32 | 89.78 |
| 524288 | 96.77 | 97.30 | 96.16 | 97.22 | 67.38 | 97.21 |

TABLE 3

Hit ratio comparison of LRU, 2Q, LRU-2, LRFU, LIRS to System 10 for trace P12.

| Cache Size | LRU Online | System 10 Online | 2Q Offline | LRU-2 Offline | LRFU Offline | LIRS Offline |
|---|---|---|---|---|---|---|
| 1024 | 4.09 | 4.16 | 4.13 | 4.07 | 4.09 | 4.08 |
| 2048 | 4.84 | 4.89 | 4.89 | 4.83 | 4.84 | 4.83 |
| 4096 | 5.61 | 5.76 | 5.76 | 5.81 | 5.61 | 5.61 |
| 8192 | 6.22 | 7.14 | 7.52 | 7.54 | 7.29 | 6.61 |
| 16384 | 7.09 | 10.12 | 11.05 | 10.67 | 11.01 | 9.29 |
| 32768 | 8.93 | 15.94 | 16.89 | 16.36 | 16.35 | 15.15 |
| 65536 | 14.43 | 26.09 | 27.46 | 25.79 | 25.35 | 25.65 |
| 131072 | 29.21 | 38.68 | 41.09 | 39.58 | 39.78 | 40.37 |
| 262144 | 49.11 | 53.47 | 53.31 | 53.43 | 54.56 | 53.65 |
| 524288 | 60.91 | 63.56 | 61.64 | 63.15 | 63.13 | 63.89 |

Figure 7:
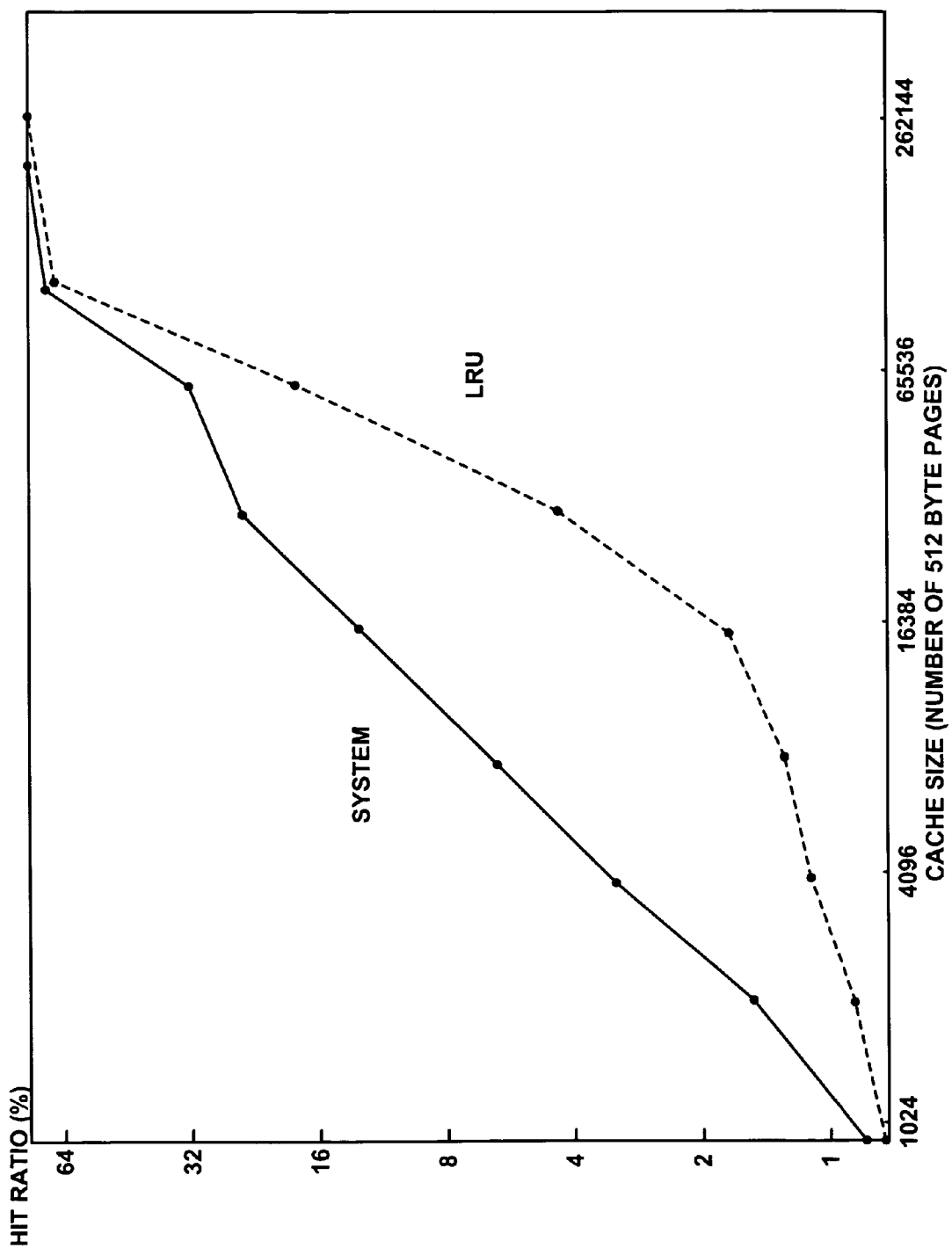
FIG. 7 is a graph showing the hit ratio performance of the adaptive replacement cache system of FIG. 1 with respect to cache size, as compared to a conventional LRU system under certain conditions.
Figure 8:
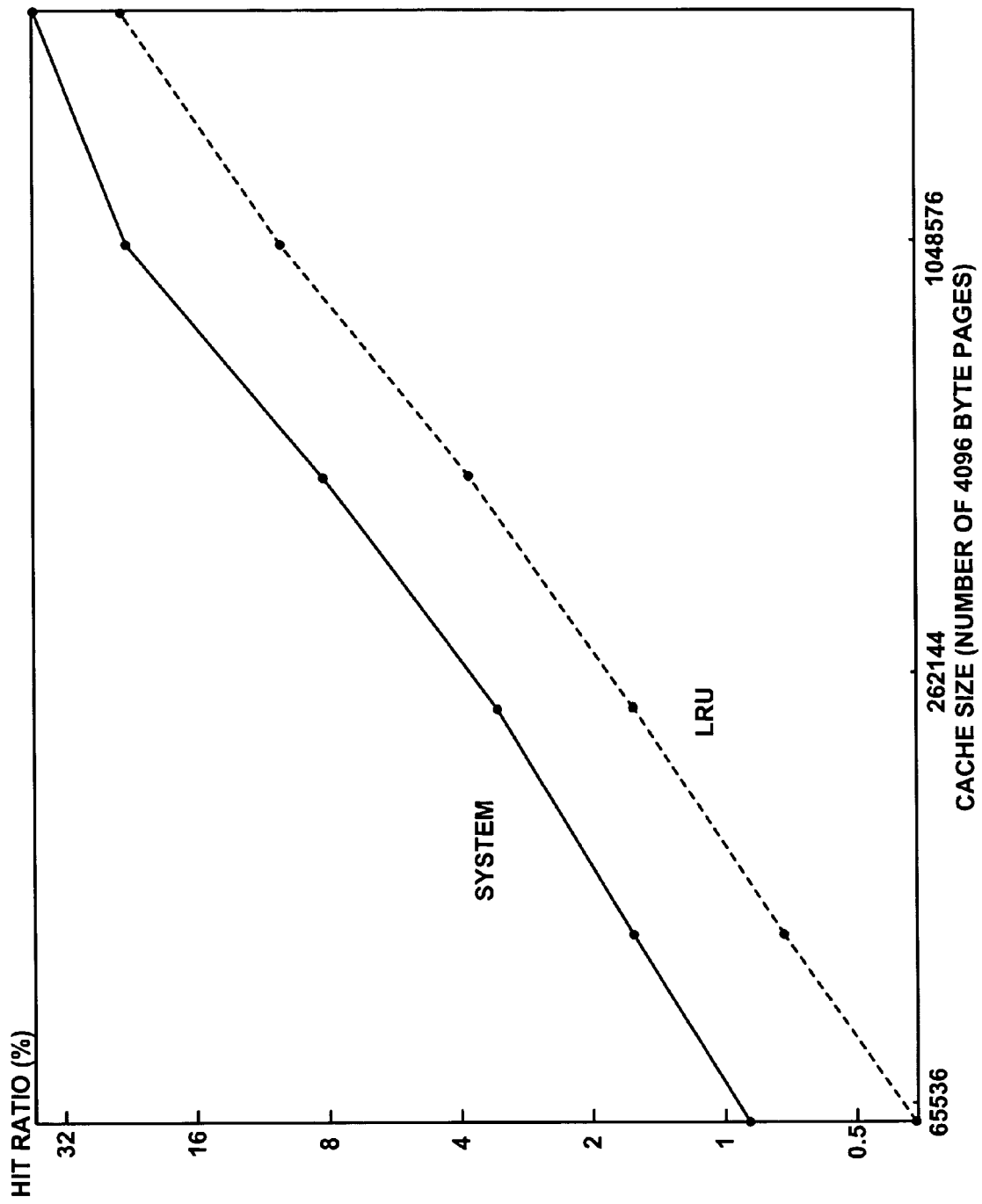
FIG. 8 is another graph showing the hit ratio performance of the adaptive replacement cache system of FIG. 1 with respect to cache size, as compared to a conventional LRU system different conditions.
Figure 9:
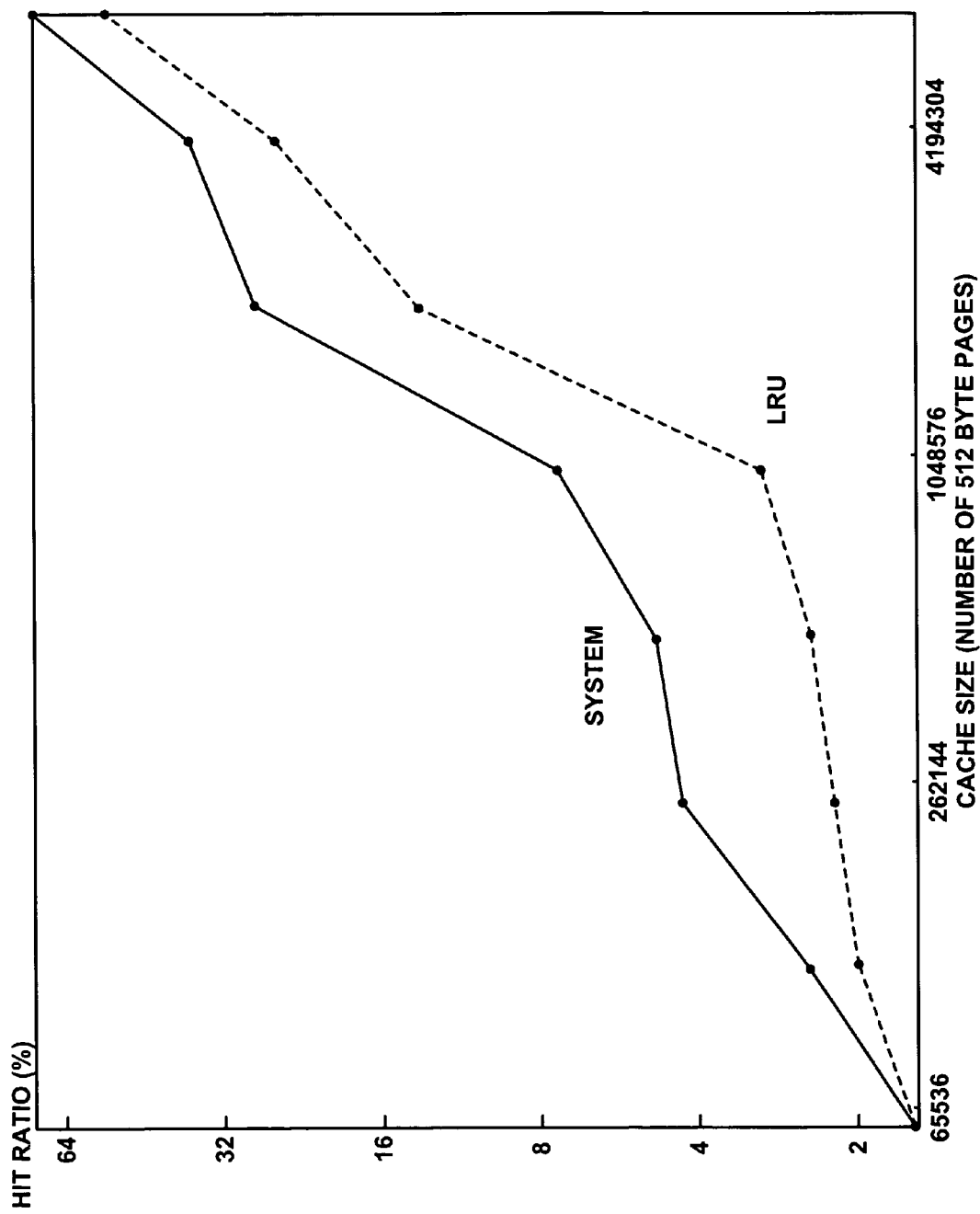
FIG. 9 is yet another graph showing the hit ratio performance of the adaptive replacement cache system of FIG. 1 with respect to cache size, as compared to a conventional LRU system under other conditions.

The LRU policy is the most widely used cache replacement policy. Table 4 FIG. 7, FIG. 8, and FIG. 9, all illustrate that system 10 outperforms the LRU policy. In addition, the performance of system 10 compared to the FRC policy shows that system 10 tunes itself as well as $FRC_p$ with the best offline selection of the parameter p. This result holds for all or most traces, indicating that system 10 is empirically universal.

TABLE 4

System 10 compared to LRU and FRC for all traces.

| Workload | Cache Size Mbytes | LRU Online | System 10 Online | FRC Offline |
|---|---|---|---|---|
| P1 | 16 | 16.55 | 28.26 | 29.39 |
| P2 | 16 | 18.47 | 27.38 | 27.61 |
| P3 | 16 | 3.57 | 17.12 | 17.60 |
| P4 | 16 | 5.24 | 11.24 | 9.11 |
| P5 | 16 | 6.73 | 14.27 | 14.29 |
| P6 | 16 | 4.24 | 23.84 | 22.62 |
| P7 | 16 | 3.45 | 13.77 | 14.01 |
| P8 | 16 | 17.18 | 27.51 | 28.92 |
| P9 | 16 | 8.28 | 19.73 | 20.82 |
| P10 | 16 | 2.48 | 9.46 | 9.63 |
| P11 | 16 | 20.92 | 26.48 | 26.57 |
| P12 | 16 | 8.93 | 15.94 | 15.97 |
| P13 | 16 | 7.83 | 16.60 | 16.81 |
| P14 | 16 | 15.73 | 20.52 | 20.55 |
| ConCat | 16 | 14.38 | 21.67 | 21.63 |
| Merge | 128 | 38.05 | 39.91 | 39.40 |
| DSI | 1024 | 11.65 | 22.52 | 18.72 |
| SPC1 | 4096 | 9.19 | 20.00 | 20.11 |

As seen in Table 4, the computational overhead required by system 10 (when measured in seconds) is comparable to the LRU and 2Q policies, while lower than that of the LRU-2 policy and dramatically lower than that of the LRFU policy.

TABLE 5

Computation overhead requirements for LRU, 2Q, LRU-2, and LRFU compared to system 10.

| Cache Size | LRU | System 10 | 2Q | LRU-2 | LRFU 10E-7 | LRFU 10E-3 | LRFU 0.99 |
|---|---|---|---|---|---|---|---|
| 1024 | 17 | 14 | 17 | 33 | 554 | 408 | 28 |
| 2048 | 12 | 14 | 17 | 27 | 599 | 451 | 28 |
| 4096 | 12 | 15 | 17 | 27 | 649 | 494 | 29 |
| 8192 | 12 | 16 | 18 | 28 | 694 | 537 | 29 |
| 16384 | 13 | 16 | 19 | 30 | 734 | 418 | 30 |
| 32768 | 14 | 17 | 18 | 31 | 716 | 420 | 31 |
| 65536 | 14 | 16 | 18 | 32 | 648 | 424 | 34 |
| 131072 | 14 | 14 | 16 | 32 | 533 | 432 | 39 |
| 262144 | 13 | 13 | 14 | 30 | 427 | 435 | 42 |
| 524288 | 12 | 13 | 13 | 27 | 263 | 443 | 45 |

Table 6 shows an overall comparison of system 10 with all the other replacement techniques discussed thus far. One advantage of system 10 is that it matches or exceeds performance of all other approaches while self-tuning. In addition, system 10 is scan resistant and requires low computational overhead.

TABLE 6

Comparison of system 10 with various other replacement policies.

| | Compute Overhead | Space Overhead | Self-Tuning | Scan Resistant | No Re-sizing |
|---|---|---|---|---|---|
| LRU | constant | 1x | Yes | No | Yes |
| LFU | log | 1x | Yes | Yes | No |
| LRU-2 | log | 1x–2x | No | Depends | Yes |
| 2Q | constant | 1x–2x | No | Depends | Yes |
| LIRS | constant (E) | unbounded | No | Depends | Yes |
| LRFU | log | 1x–2x | No | Depends | Yes |
| FBR | constant (E) | 1x | No | Depends | No |
| System 10 | constant | 2x | Yes | Yes | Yes |

The notation "constant (E)" in Table 6 indicates that the corresponding algorithm is constant-time in expected sense only, whereas notation "constant" indicates that the corresponding algorithm is constant-time in the worst case. The latter is more desirable than the former.

It is to be understood that the specific embodiments of the present invention that have been described are merely illustrative of certain applications of the principle of the present invention. Numerous modifications may be made to the system and method for implementation of adaptive replacement cache policy invention described herein without departing from the spirit and scope of the present invention.

What is claimed is:

1. A method for adaptively managing pages in a memory, comprising:
   defining a cache memory;
   defining a cache directory;
   organizing the cache directory into four disjoint lists of pages: list T1, list T2, list B1, and list B2; and
   wherein the cache memory contains pages that are members of any of the list T1 or the list T2.

2. The method of claim 1, further comprising adaptively varying the sizes of the lists T1, T2, B1, and B2, in response to a variable workload.

3. The method of claim 1, wherein the lists T1 and B1 have a variable total length;
   wherein the lists T2 and B2 have a variable total length;
   wherein defining the cache memory comprising defining a cache memory size measured as the number of pages the cache memory can hold; and
   further comprising maintaining the total length of the lists T1 and B1 to approximately the cache memory size, and maintaining the total length of the lists T2 and B2 to approximately the cache memory size.

4. The method of claim 3, further comprising maintaining the lists B1 and B1 to a total length that is less than, or equal to the cache memory size.

5. The method of claim 1, wherein each member page of the list T1 and each member page of the list B1 has either been requested exactly once since a last time it was removed from the directory, or it was requested only once and was never removed from the cache memory; and
   wherein each member page of the list T2 and each member page of the list B2 has either been requested more than once since a last time it was removed from the directory, or was requested more than once and was never removed from the cache memory.

6. The method of claim 1, wherein member pages in each of the lists T1, B1, T2, and B2 appear in decreasing order according to a latest request time for each page; and wherein each list comprises a top and a bottom, with the top listing most recent member pages and the bottom listing least recent member pages.

7. The method of claim 6, wherein a most recently requested page in the list B1 is less recent than a least recently requested page in the list T1; and wherein a most recently requested page in the list B2 is less recent than a least recently requested page in the list T2.

8. The method of claim 1, further comprising maintaining a target size number for the list T1 and a target size number for the list T2; and wherein the sum of the target size for the list T1 and the target size for the list T2 is equal to the number of pages the cache memory can hold.

9. The method of claim 8, wherein if a requested page is found in either the list T1 or the list T2, moving the requested page to a top position in the list T2; and wherein if the requested page is found in the list B1, increasing the target size for the list T1 by an amount, and decreasing the target size for the list T2 by the same amount.

10. The method of claim 9, wherein if the target size of the list T1 is less than an actual size of the list T1, moving the page at a bottom position of the list T1 to a top position of the list B1, and moving the requested page to a top position of the list T2; and wherein if the target size of the list T1 is greater than or equal to an actual size of the list T1, moving a page at a bottom position of the list T2 to a top position of the list B2, and moving the requested page to the top position of the list T2.

11. The method of claim 9, wherein if the requested page is found in the list B2, increasing the target size of the list T2 by a predetermined amount, and decreasing the target size of the list T1 by the same amount; and wherein if the target size of the list T1 is less than or equal to an actual size of the list T1, moving the page at a bottom position of the list T1 to a top position of the list B1, and moving the requested page to a top position of the list T2.

12. The method of claim 11, wherein if the target size of the list T1 is greater than the actual size of the list T1, moving the page at a bottom position of the list T2 to a top position of the list B2, and moving the requested page to a top position of the list T2; and wherein if the requested page is not found in any of the lists T1, T2, B1, or B2, moving the requested page to a top position of the list T1.

13. The method of claim 12, wherein if the total length of the lists T1 and B1 is equal to a cache size and the list B1 is not empty, removing a bottom page in the list B1.

14. The method of claim 13, wherein if the target size for the list T1 is greater than the actual size of the list T1, moving a page at a bottom position of the list T2 to a top position of the list B2; and wherein if the target size for the list T1 is less than or equal to an actual size of the list T1, moving the page at a bottom position of the list T1 to a top position of the list B1.

15. The method of claim 14, wherein if the total length of the lists T1 and B1 is equal to the cache size and the list B1 is empty, removing a bottom page in the list T1.

16. The method of claim 14, wherein if the total length of the lists T1 and B1 is less than the cache size and the total length of the lists T1, T2, B1, and B2 is equal to twice the cache size, removing a bottom page in the list B2.

17. The method of claim 16, wherein if the target size of the list T1 is greater than an actual size of the list T1, moving a page at a bottom position of the list T2 to a top position of the list B2; and wherein if the target size of the list T1 is less than or equal to the actual size of the list T1, moving a page at a bottom position of the list T1 to a top position of the list B1.

18. An apparatus for adaptively managing pages in a memory, comprising:

a cache memory;

a cache directory that is organized into four disjoint lists of pages: list T1, list T2, list B1, and list B2; and wherein the cache memory contains pages that are members of any of the list T1 or the list T2.

19. The apparatus of claim 18, wherein the sizes of the lists T1, T2, B1, and B2 are changed in response to a variable workload.

20. A computer program product having a plurality of executable instruction codes that are stored on a computer-readable medium, for adaptively managing pages in a cache memory, comprising:

a first set of instruction codes for organizing a cache directory into four disjoint lists of pages: list T1, list T2, list B1, and list B2; and wherein the cache memory contains pages mat are members of any of the list T1 or the list T2.

* * * * *